United States Patent [19]
Lee

[11] Patent Number: 6,076,000
[45] Date of Patent: Jun. 13, 2000

[54] MOBILE TELEPHONE BATTERY CHARGER

[76] Inventor: Huey Ming Lee, 5F, No. 187, Lane 3, Alley 219, Sec. 7, Chung San N. Rd., Taipei, Taiwan

[21] Appl. No.: 08/908,183

[22] Filed: Aug. 7, 1997

Related U.S. Application Data

[63] Continuation of application No. 08/339,736, May 25, 1994, abandoned, which is a continuation-in-part of application No. 08/066,844, May 26, 1993, abandoned.

[51] Int. Cl.[7] .................................................... H04Q 7/32
[52] U.S. Cl. ............................................ 455/569; 455/573
[58] Field of Search ..................................... 455/550, 569, 455/573, 572, 575, 127, 350, 557; 374/432, 433

[56] References Cited

U.S. PATENT DOCUMENTS

| | | | |
|---|---|---|---|
| 5,282,246 | 1/1994 | Yang | 379/432 X |
| 5,313,514 | 5/1994 | Kanasashi | 379/58 |
| 5,333,177 | 7/1994 | Braitberg et al. | 379/59 |
| 5,487,182 | 1/1996 | Hansson | 455/90 |
| 5,642,402 | 6/1997 | Vilmi et al. | 455/569 |

FOREIGN PATENT DOCUMENTS

| | | |
|---|---|---|
| 494780 A2 | 7/1992 | European Pat. Off. . |
| 92/14328 | 8/1992 | WIPO . |

*Primary Examiner*—William G. Trost
*Attorney, Agent, or Firm*—Rosenberg, Klein & Lee

[57] ABSTRACT

A mobile telephone battery charger including a power input plug assembly for connecting to a car's battery power supply outlet, a charging connector assembly connected to the power input plug assembly by a cord for connecting to the battery charging port of a mobile telephone, a speaker and a control circuit being installed in the power input plug assembly and a microphone being installed in the charging connector assembly for a hand-free communication at a distance through the mobile telephone by means of the mode selection of a switch on the power input plug assembly.

4 Claims, 5 Drawing Sheets

MOBILE TELEPHONE BATTERY CHARGER

CROSS REFERENCE TO RELATED APPLICATION

This application is a continuation of application Ser. No. 08/339,736 filed May 25, 1994 now abandoned, which is a continuation-in-part of 08/066,844, filed May 26, 1993, now abandoned.

BACKGROUND OF THE INVENTION

The present invention relates to mobile telephones, and, more particularly, the present invention relates to a mobile telephone battery charger with a hand-free voice transmitting-receiving circuit for hand-free communications through the mobile telephone being charged.

Various mobile telephones are known and widely accepted for the advantage of mobility. However, it is dangerous to talk over a mobile telephone being held with one hand while driving the car with the other hand. Various mobile telephone racks have been disclosed, having a transmitter and receiver circuit consisted of a loud-speaker and a microphone for talking over a mobile telephone with the hands free. These mobile telephone racks allow car drivers to use a mobile telephone conveniently with both hands free for driving. However, these mobile telephone racks are still not satisfactory in use. One drawback of these mobile telephone racks is the complicated wiring which may affect the transmission quality when tangled. Another drawback of these mobile telephone racks is that the complicated wiring may be hooked by the gear lever or any other parts of the car, to hinder driving. Still another drawback of these mobile telephone racks is their complicated structure and expensive manufacturing cost. A yet further drawback of these mobile telephone racks is their complicated mounting procedure which makes the consumers unwilling to install a mobile telephone rack.

SUMMARY OF THE INVENTION

The principal object of the present invention is to provide a mobile telephone battery charger which has a transmitting and receiving circuit for allowing the user to talk over the mobile telephone with both hands free while the battery of the mobile telephone is being charged. It is another object of the present invention to provide a mobile telephone battery charger with a hands-free voice transmitting-receiving circuit which is simple in structure and inexpensive to manufacture. It is still another object of the present invention to provide a mobile telephone battery charger with a hands-free voice transmitting-receiving circuit which is suitable for use with any of a variety of mobile telephones.

DETAILED DESCRIPTION OF THE PREFERRED EMBODIMENTS

Figure 1:
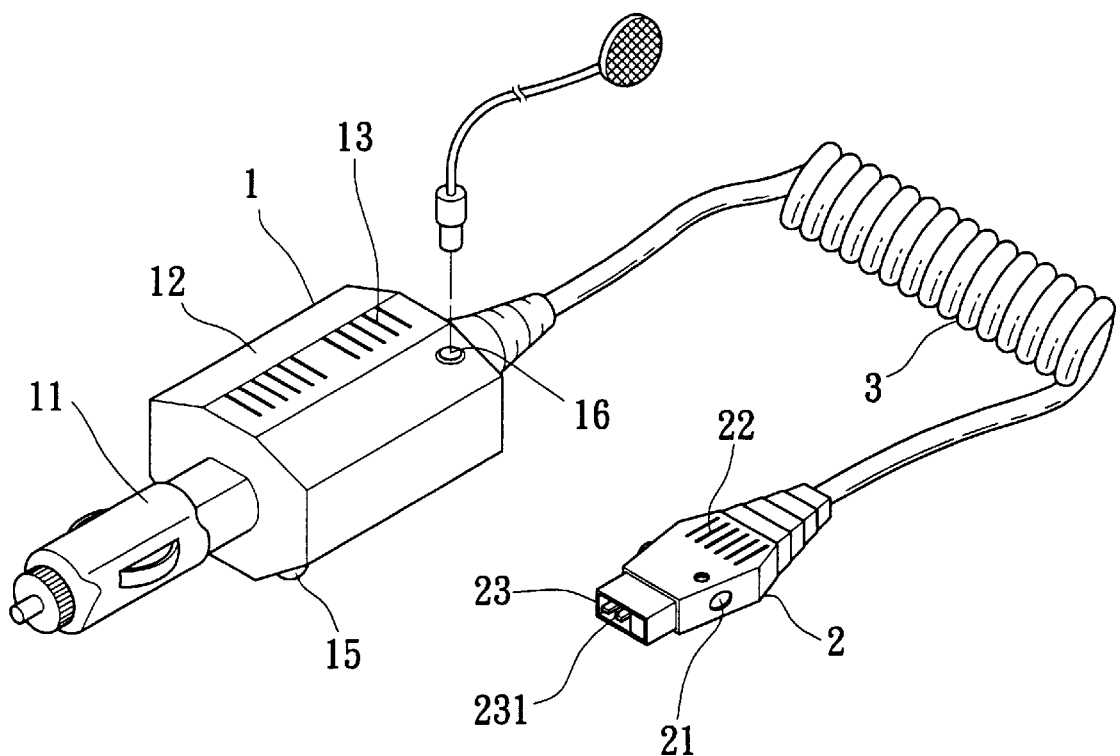
FIG. 1 is a perspective view of a mobile telephone battery charger according to the present invention.
Figure 2:
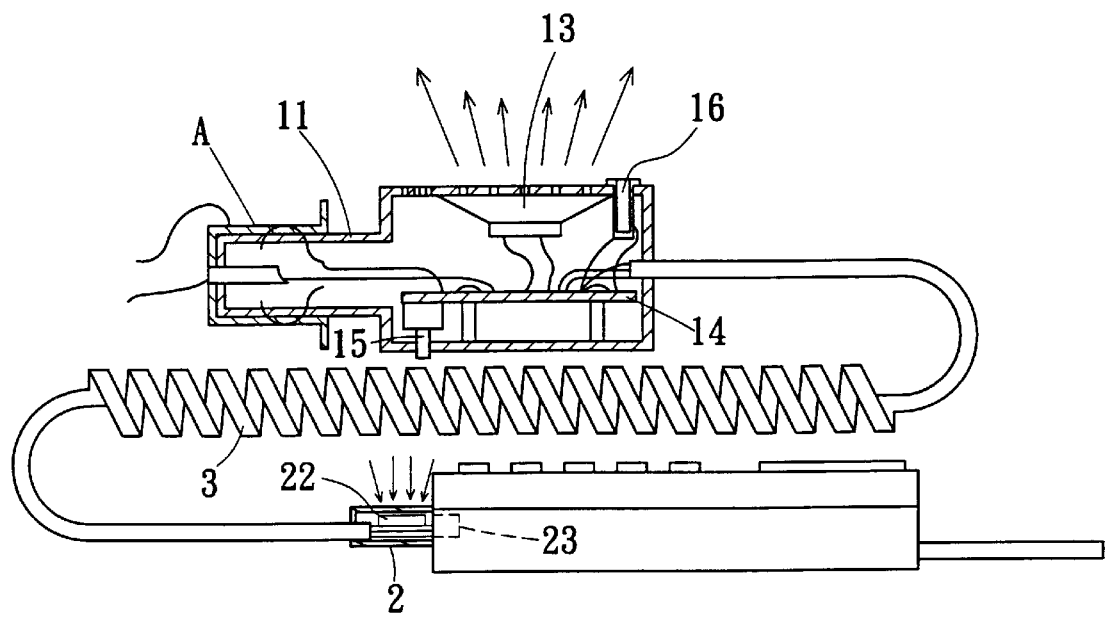
FIG. 2 illustrates the mobile telephone battery charger connected to a car's power supply outlet to charge a mobile telephone.

Referring to FIGS. 1 and 2, a mobile telephone battery charger in accordance with the present invention is generally comprised of a power input plug assembly 1, a charging connector assembly 2, and a cord 3.

The power input plug assembly 1 comprises a front connector 11, which is designed for connecting to a car's power supply outlet, and a chamber 12 connected to the front connector 11. A loud-speaker 13 and a control circuit 14 are installed inside the chamber 12. A switch 15 and a microphone jack 16 are made on the chamber 12 on the outside. The cord 3 has one end connected to the chamber 12, and an opposite end connecting to the charging connector assembly 2. The charging connector assembly 2 is for connecting to a car's battery charging socket, comprising retainers 21 on the outside for positioning, a microphone 22 on the inside, and contacts 231 in a front mounting port 23 thereof.

Referring to FIG. 2, the front connector 11 of the power input plug assembly 1 is connected to the car's power supply outlet (the socket for cigarette lighter) A, and the charging connector assembly 2 is connected to the battery charging socket of the mobile telephone. The microphone 22 may be arranged in a different way. Directly mounting the microphone 22 in the charging connector assembly 2 can effectively eliminate the interference of vibration noises. When connected, the car's battery power supply is connected to the battery of the mobile telephone to charge it to the saturation. If the mobile telephone is triggered by a call, the user can receive the call through the loud-speaker 13 or send the voice through the microphone 23 as the start key of the mobile telephone is pressed. The switch 15 is for hand-free selection control. The user can use the loud-speaker 13 and the microphone 23 for a hands-free conversation by switching on the switch 15, or use the mobile telephone directly for communication with the opponent by switching off the switch 15. The microphone jack 16 is for connecting an external microphone by a microphone cord when better communication quality is required.

Figure 3:
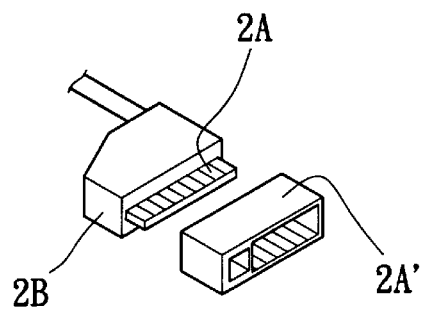
FIG. 3 is a perspective view of an alternate form of the charging connector assembly for the charger of the present invention.

Referring to FIG. 3, therein illustrated is an alternate form of the charging connector assembly 2. According to this alternate form, the charging connector assembly is comprised of a fixed adapter 2A having a peripheral block 2B to hold the microphone 22, and any of a variety of charging connectors 2A' detachably connected to the fixed adapter 2A for connecting to any of a variety of mobile telephones.

Figure 4:
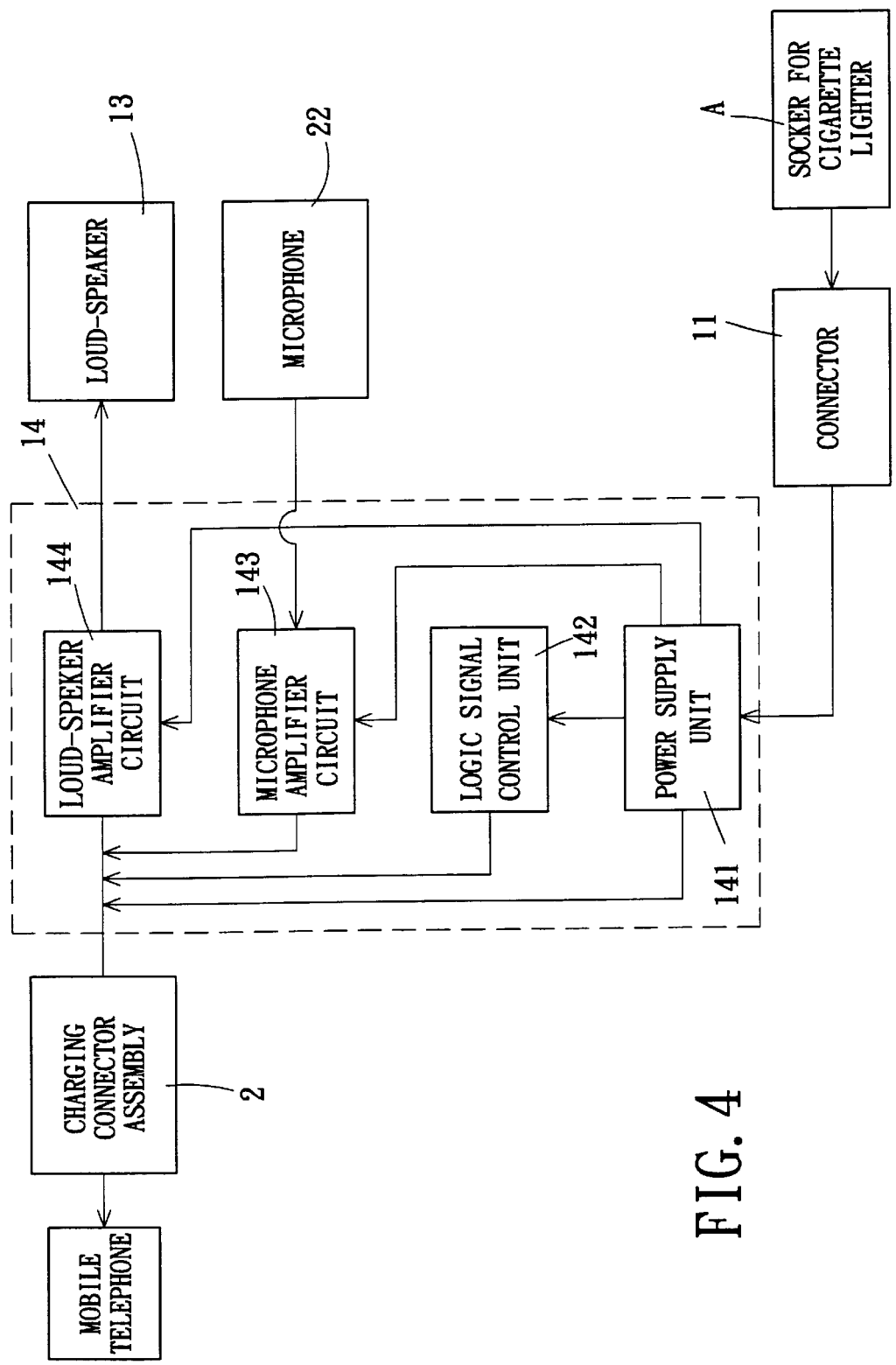
FIG. 4 is a schematic block diagram of the control circuit for the battery charger of this invention.
Figure 5:
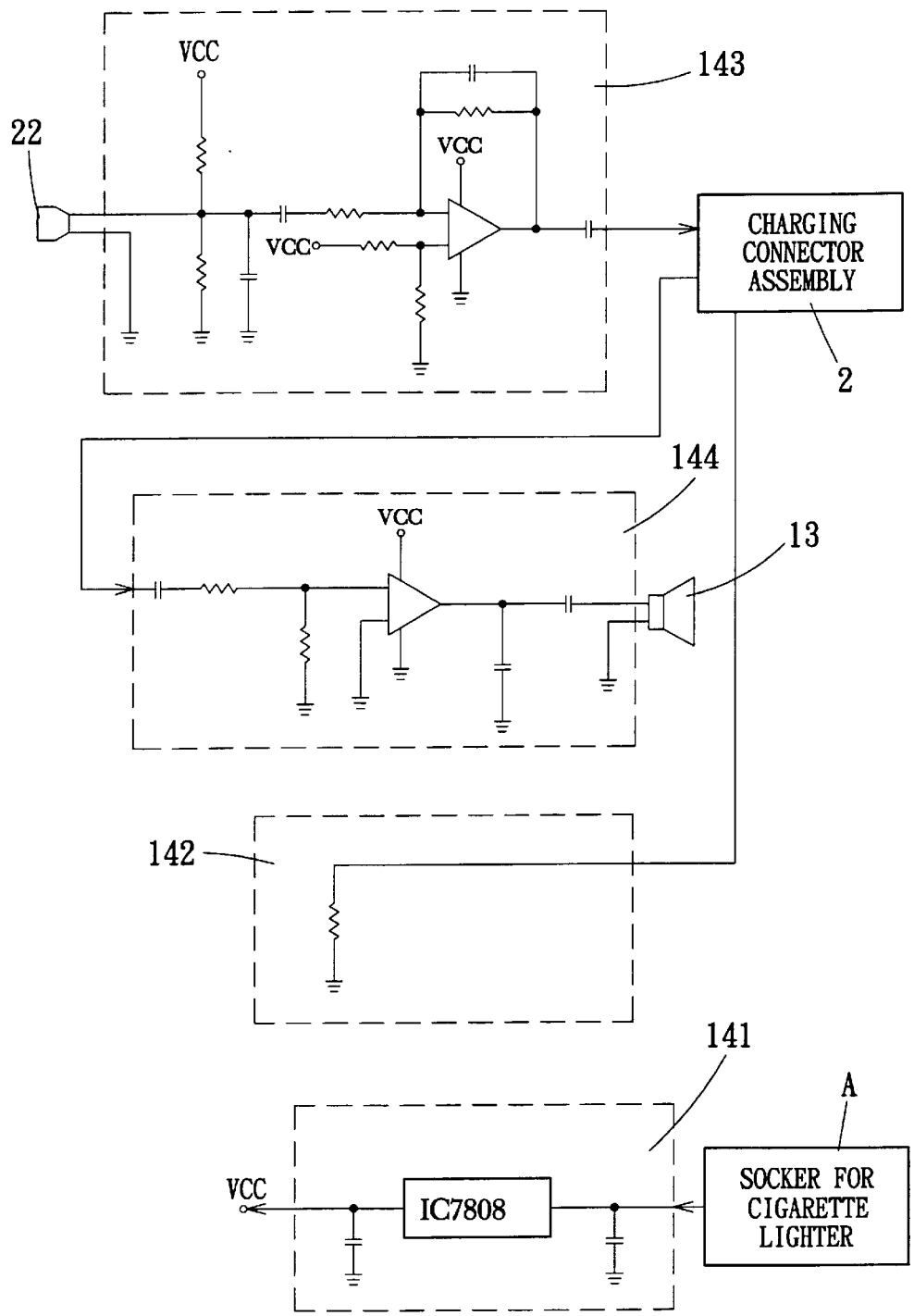
FIG. 5 is a circuit diagram therefor.

Please refer to the annexed additional block diagram and circuit diagram of FIGS. 4 and 5, the microphone 22, the loud-speaker 12, and the switch 15 are installed in the control circuit 14. The control circuit 14 comprises a power supply unit 141 connected to the socket for the cigarette lighter A (car battery power supply outlet) through the connector 11 to obtain the necessary working voltage, a logic signal control unit 142 connected between the switch 15 and the charging connector assembly 2, a microphone amplifier circuit 143, and a loud-speaker amplifier circuit 144. The logic signal control unit 142 detects the position of the switch 15 to see if it is switched to the mobile telephone mode or hand-free mode. The microphone amplifier circuit 143 is connected between the microphone 22 and the charging connector assembly 2. When a sound signal is picked up by the microphone 22, it is amplified by the microphone amplifier circuit 143 and then sent to the mobile telephone through the charging connector assembly 2. The loud-speaker amplifier circuit 144 is connected between the loud-speaker 13 and the charging connector assembly 2. When the mobile telephone receives the sound signal from the opponent, it is sent to the loud-speaker amplifier circuit 144 through the charging connector assembly 2 and amplified, and then sent out through the loud-speaker 13.

Figure 6:
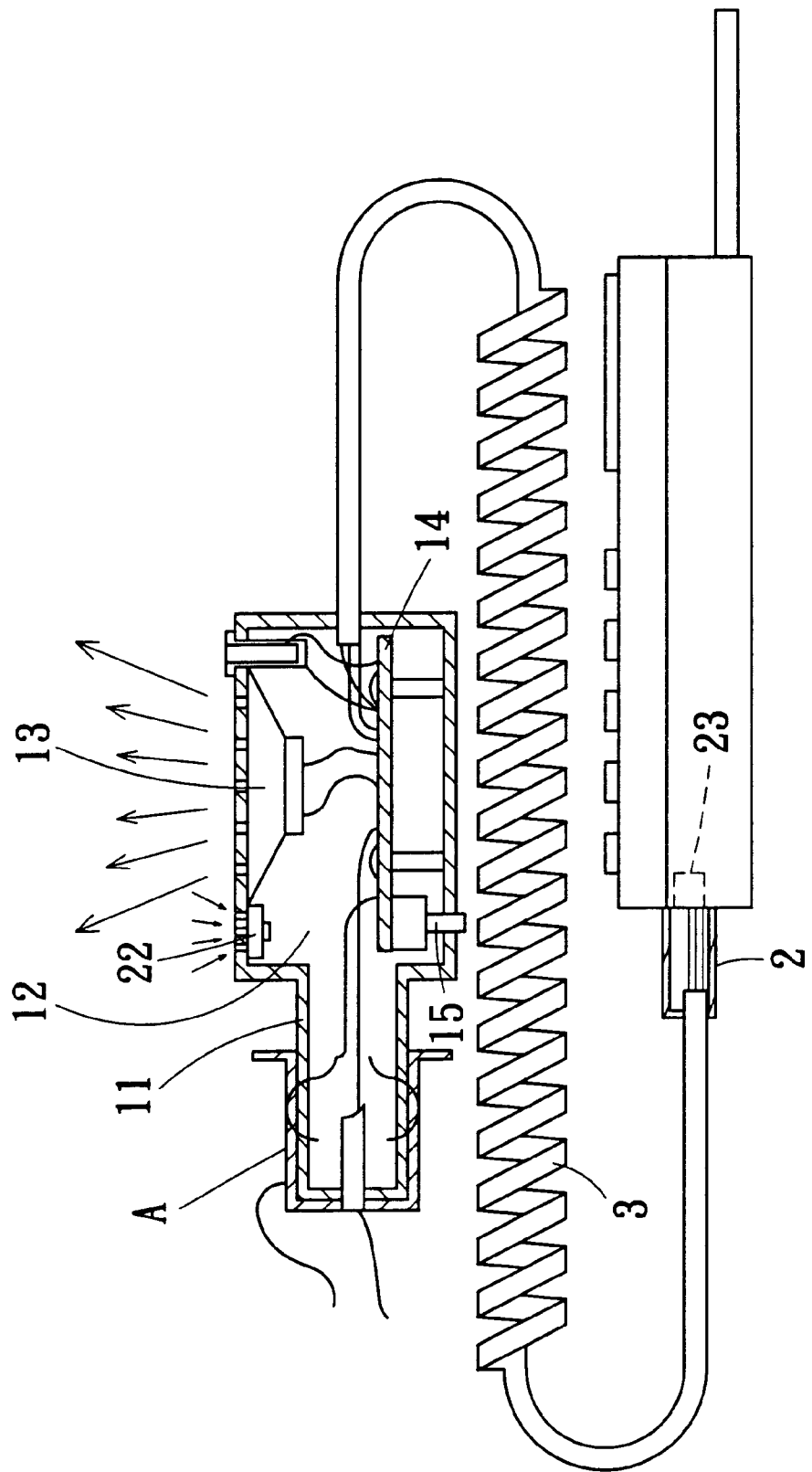
FIG. 6 is a perspective view of an alternate embodiment of the battery charger of the present invention.

Originally, the microphone 22 is mounted on the charging connector assembly 2. As an alternate arrangement of the present invention, the microphone 22 is incorporated with the control circuit 14 and received together inside the chamber (see FIG. 6).

While only few embodiments of the present invention has been shown and described, it will be understood that various modifications and changes could be made without departing from the spirit and scope of the invention. For example, the microphone 22 may be installed in the power input plug assembly 1, or a lapel microphone may be alternatively used.

What is claimed is:

1. A hands free, portable, combined mobile telephone and battery charger device comprising:

a power input plug assembly having at one end a connector adapted for electrically connecting to a battery power supply outlet of a car, a housing at an opposite end defining a chamber, an alteration switch mounted in said housing for selection between a hands free mode and a mobile telephone mode, a microphone jack mounted in said housing, a speaker and a control circuit respectively mounted in the chamber of said housing, said control circuit being connected to said speaker and said alteration switch by a respective conductor;

a charging connector coupled to said power input plug assembly, said charging connector including retainers and a front mounting port, said front mounting port having electric contacts adapted for electrically connecting to a battery charging port of a mobile telephone; and, a microphone coupled to said control circuit of said power plug assembly.

2. The combined mobile telephone and battery charger device of claim 1 wherein said microphone is installed in said power input plug assembly.

3. The combined mobile telephone and battery charger device of claim 1 wherein said microphone is installed in said charging connector.

4. The combined mobile telephone and battery charger device of claim 2 wherein said microphone is installed in said chamber of said power input plug assembly housing.

* * * * *